(12) United States Patent
Chang

(10) Patent No.: US 6,481,413 B2
(45) Date of Patent: Nov. 19, 2002

(54) ELECTRONIC ACCELERATOR OF A MOTORIZED VEHICLE

(76) Inventor: Hui-Lung Chang, 58, Ma Yuan West St., Taichung (TW)

( * ) Notice: Subject to any disclaimer, the term of this patent is extended or adjusted under 35 U.S.C. 154(b) by 71 days.

(21) Appl. No.: 09/824,006

(22) Filed: Mar. 30, 2001

(65) Prior Publication Data

US 2002/0139347 A1 Oct. 3, 2002

(51) Int. Cl.[7] .............................................. F02D 9/00
(52) U.S. Cl. ....................... 123/399; 180/65.1; 180/65.8
(58) Field of Search ..................... 123/399; 180/65.1, 180/65.8

(56) References Cited

U.S. PATENT DOCUMENTS

| | | | | |
|---|---|---|---|---|
| 3,722,365 A | * | 3/1973 | Olsson | 91/1 |
| 3,805,279 A | * | 4/1974 | Fliesser et al. | 352/141 |
| 3,898,874 A | * | 8/1975 | Wawra | 307/650 |
| 4,922,177 A | * | 5/1990 | Mausner | 123/399 |
| 5,726,544 A | * | 3/1998 | Lee | 123/352 |
| 5,828,290 A | * | 10/1998 | Buss et al. | 123/399 |

* cited by examiner

*Primary Examiner*—Erick Solis

(57) ABSTRACT

An electronic accelerator of a motorized vehicle includes a shield mounted between a light sensitive resistor and a focusing type LED. The amount of the light source received by the light sensitive resistor from the focusing type LED can be converted into different signals, so as to control the rotational speed of the motor. The shield may be applied to the accelerator of a vehicle, including the accelerating handle, the accelerating pedal, or the accelerating lever. When the accelerator drives the shield to rotate, the arc-shaped surface secured on the shield has a shielding area gradually reduced from one side to the other side, thereby allowing the focusing type LED has a greater amount of light source to be emitted on the light sensitive resistor, thereby preventing the electronic elements from wearing due to friction during operation.

2 Claims, 6 Drawing Sheets

ELECTRONIC ACCELERATOR OF A MOTORIZED VEHICLE

BACKGROUND OF THE INVENTION

1. Field of the Invention

The present invention relates to an electronic accelerator of a motorized vehicle.

2. Description of the Related Prior Art

In general, an electronic member having an adjustable resistor may be often used to control the rotational speed of the motor of a conventional motorized vehicle in accordance with the prior art. The resistance is decreased during the accelerating process, while the resistance is increased during the decelerating process, thereby changing the output current of the rotational speed controller to the motor.

According to the formula of V(voltage)=I(current)×R (resistance). It is found that, during the accelerating process, the resistance is decreased, and the current increased, so that the rotational speed is increased. On the contrary, during the decelerating process, the resistance is increased, and the current decreased, so that the rotational speed is decreased.

However, the conventional electronic member having an adjustable resistor is easily worn out due to the friction, thereby decreasing the lifetime thereof.

SUMMARY OF THE INVENTION

The primary objective of the present invention is to provide an electronic accelerator of a motorized vehicle including a shield mounted between a light sensitive resistor and a focusing type LED. The amount of the light source received by the light sensitive resistor from the focusing type LED can be converted into different signals, so as to control the rotational speed of the motor. The shield may be applied to the accelerator of a vehicle, including the accelerating handle, the accelerating pedal, or the accelerating lever. When the accelerator drives the shield to rotate, the arc-shaped surface secured on the shield has a shielding area gradually reduced from one side to the other side, thereby allowing the focusing type LED has a greater amount of light source to be emitted on the light sensitive resistor, thereby preventing the electronic elements from wearing due to friction during operation.

In accordance with the present invention, the electronic accelerator of a motorized vehicle comprises:

a handlebar;

an accelerating handle rotatably mounted on the handlebar;

a light sensitive resistor secured on the handlebar;

a focusing type LED secured on the handlebar and spaced apart from the light sensitive resistor;

a fixing housing mounted on the handlebar for entirely covering the light sensitive resistor and the focusing type LED;

a shield mounted on the accelerating handle to rotate therewith, and located between the light sensitive resistor and the focusing type LED; and an arc-shaped surface secured on the shield to move therewith, and located between the light sensitive resistor and the focusing type LED, the arc-shaped surface having a shielding area gradually reduced from one side to the other side;

wherein, when the accelerating handle is rotated relative to the handlebar, the shield is rotated to move the arc-shaped surface to adjustably shield a light source receiving amount of the light sensitive resistor from the focusing type LED, and the light sensitive resistor transmits a signal to a rotational speed controller, so as to increase or decrease a speed of a motor.

In accordance with one embodiment of the present invention, the accelerator is provided with two shields, two light sensitive resistors, and two focusing type LED, the shield having two sides respectively provided with two shield planes and two shield inclined faces, so as to increase or decrease a speed of a motorized vehicle when the motorized vehicle is moved forward or backward.

Further benefits and advantages of the present invention will become apparent after a careful reading of the detailed description with appropriate reference to the accompanying drawings.

DETAILED DESCRIPTION OF THE INVENTION

Figure 1:
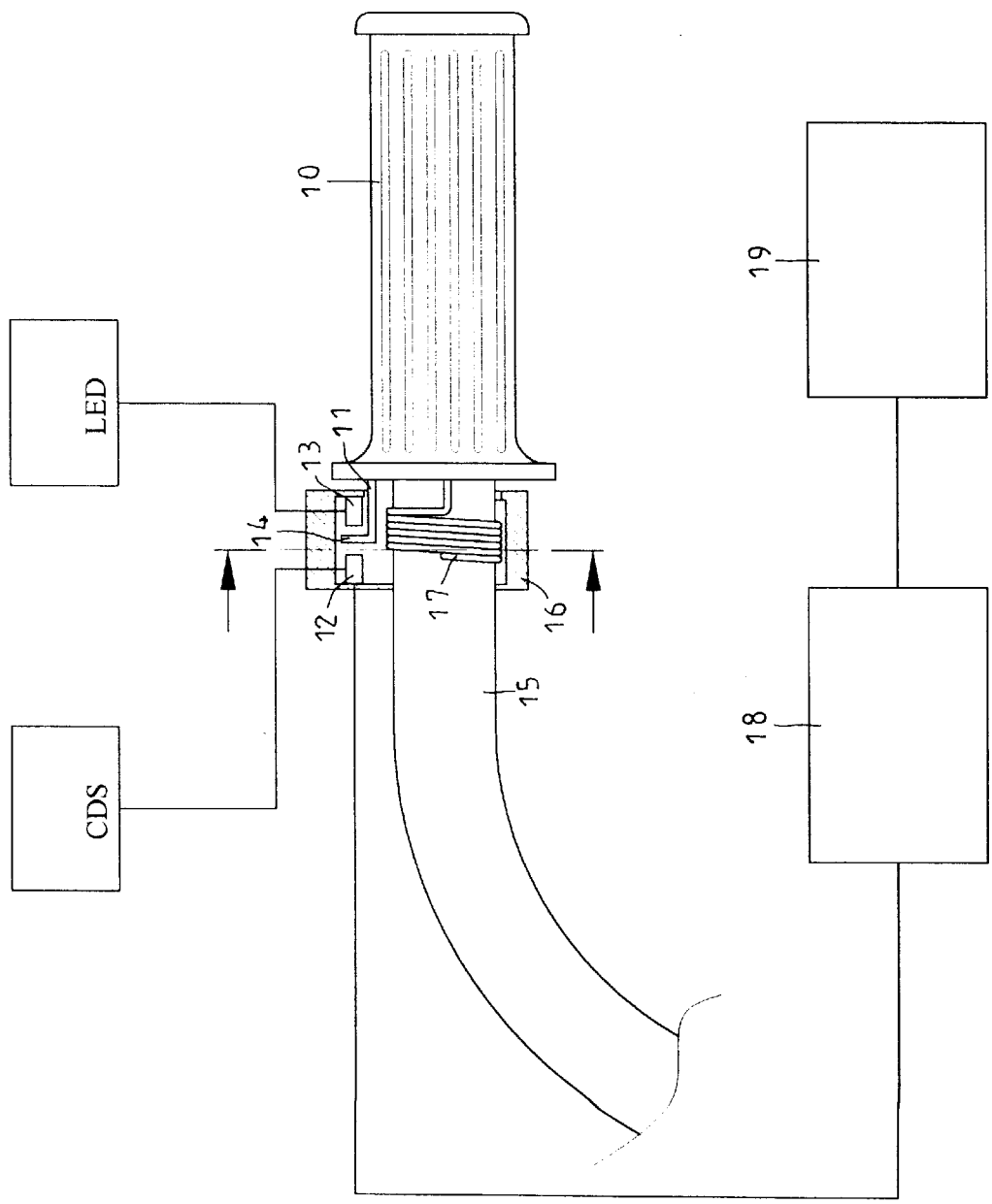
FIG. 1 is a cross-sectional schematic assembly view of an electronic accelerator of a motorized vehicle in accordance with a first embodiment of the present invention.
Figure 2:
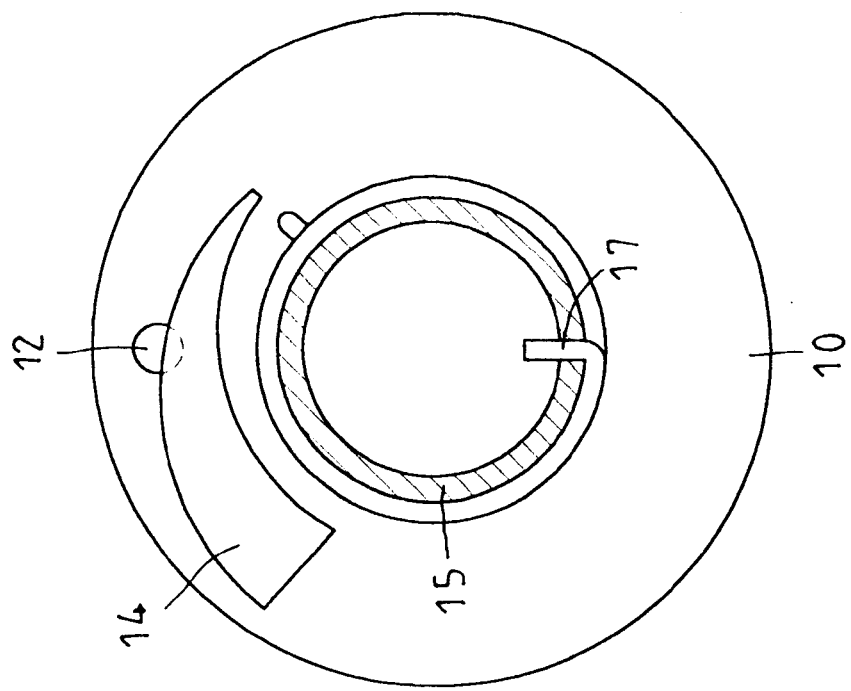
FIG. 2 is a schematic use state view of the electronic accelerator of a motorized vehicle as shown in FIG. 1.
Figure 2:
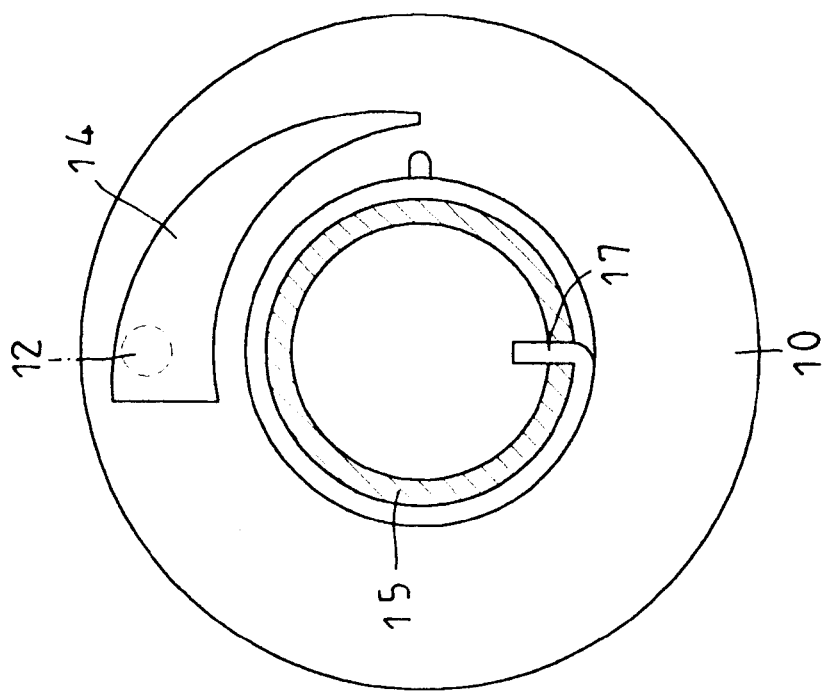

Referring to the drawings and initially to FIGS. 1 and 2, an electronic accelerator of a motorized vehicle in accordance with a first embodiment of the present invention primarily comprises a handlebar 15, an accelerating handle 10 rotatably mounted on the handlebar 15, a light sensitive resistor 12 secured on the handlebar 15, a focusing type LED 13 secured on the handlebar 15 and spaced apart from the light sensitive resistor 12, a fixing housing 16 mounted on the handlebar 15 for entirely covering the light sensitive resistor 12 and the focusing type LED 13, thereby preventing the light sensitive resistor 12 from transmitting an erroneous signal due to the ambient light, a shield 11 mounted on the accelerating handle 10 to rotate therewith, and located between the light sensitive resistor 12 and the focusing type LED 13, and an arc-shaped surface 14 secured on the shield 11 to move therewith, and located between the light sensitive resistor 12 and the focusing type LED 13. The arc-shaped surface 14 has a shielding area which is gradually reduced from one side to the other side. A torsion spring 17 is mounted between the accelerating handle 10 and the handle 15, whereby the accelerating handle 10 can be restored automatically by the restoring force of the torsion spring 17, thereby achieving the purpose of reducing the speed.

By such an arrangement, the arc-shaped surface 14 of the shield 11 will shield the light source from the focusing type LED 13 to the light sensitive resistor 12. When the accelerating handle 10 is rotated relative to the handlebar 15, the shield 11 is rotated to move the arc-shaped surface 14 between the light sensitive resistor 12 and the focusing type LED 13. The arc-shaped surface 14 whose shielding area is gradually reduced increases the light source receiving amount of the light sensitive resistor 12 from the focusing type LED 13. The amount of the light source received by the light sensitive resistor 12 from the focusing type LED 13 is converted into different signals, and the light sensitive resistor 12 transmits the signals to the rotational speed controller 18, thereby increasing the current output of the rotational speed controller 18 to the motor 19, so as to achieve the accelerating purpose.

Figure 3:
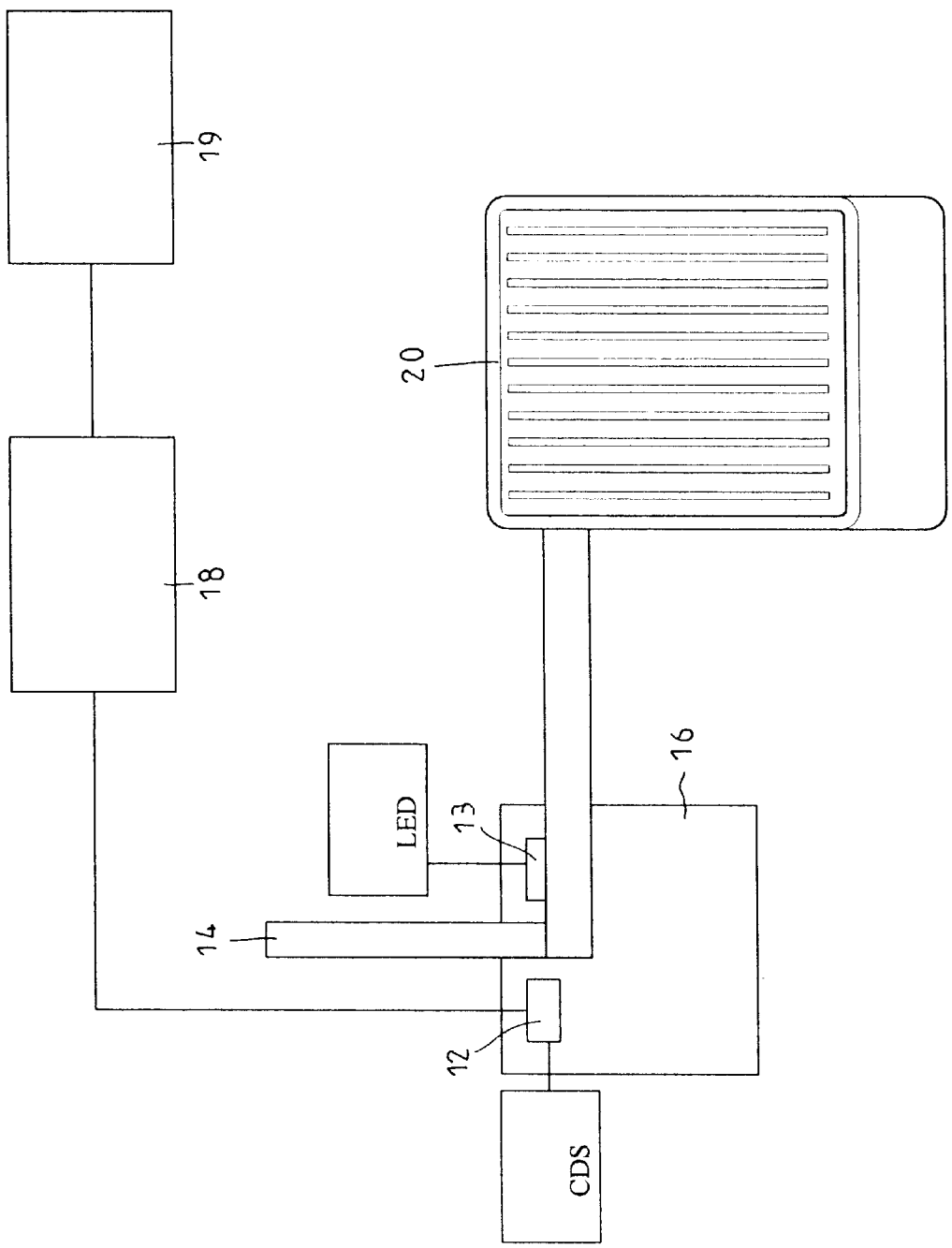
FIG. 3 is a cross-sectional schematic assembly view of an electronic accelerator of a motorized vehicle in accordance with a second embodiment of the present invention.
Figure 4:
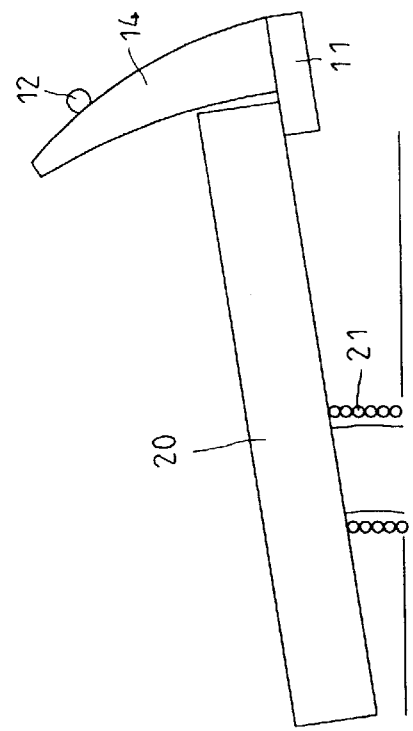
FIG. 4 is a schematic use state view of the electronic accelerator of a motorized vehicle as shown in FIG. 3.
Figure 4:
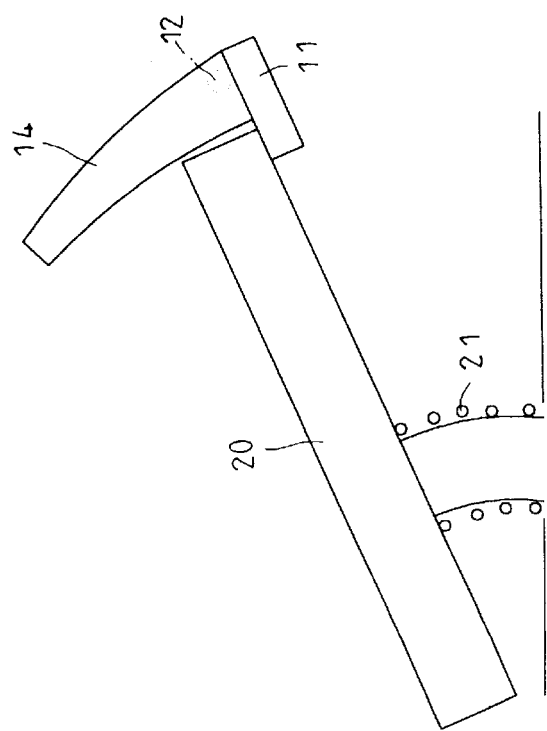

Referring to FIGS. 3 and 4, an electronic accelerator of a motorized vehicle in accordance with a second embodiment of the present invention is used to an accelerating pedal 20. The shield 11 is mounted on the accelerating pedal 20. When the rider's foot treads the accelerating pedal 20, the shield 11 is driven to move the arc-shaped surface 14, so that the shielding effect of the arc-shaped surface 14 on the light sensitive resistor 12 is gradually reduced, while the light source receiving amount of the light sensitive resistor 12 from the focusing type LED 13 is gradually increased, and the light sensitive resistor 12 transmits the signals to the rotational speed controller 18, thereby increasing the current output of the rotational speed controller 18 to the motor 19, so as to achieve the accelerating purpose. A compression spring 21 is mounted on the accelerating pedal 20, so that the accelerating pedal 20 can be restored by the restoring force of the compression spring 21, thereby achieve the decelerating purpose.

Figure 5:
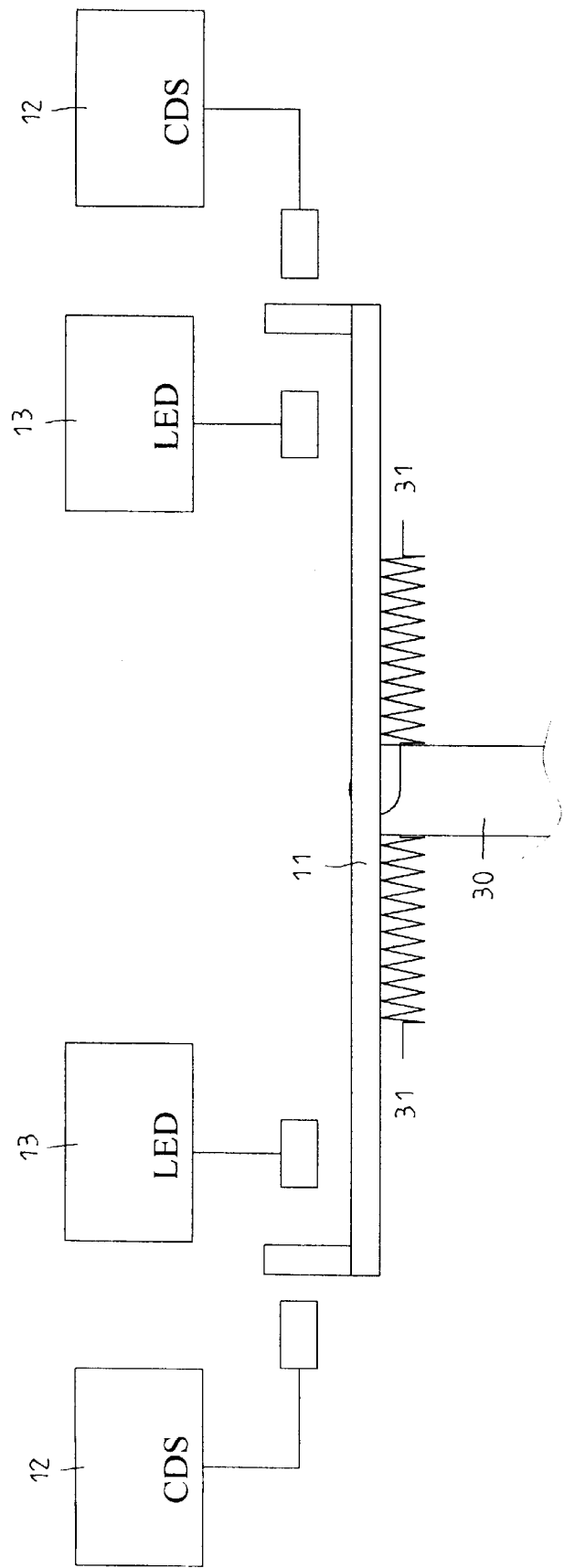
FIG. 5 is a cross-sectional schematic assembly view of an electronic accelerator of a motorized vehicle in accordance with a third embodiment of the present invention.
Figure 6:
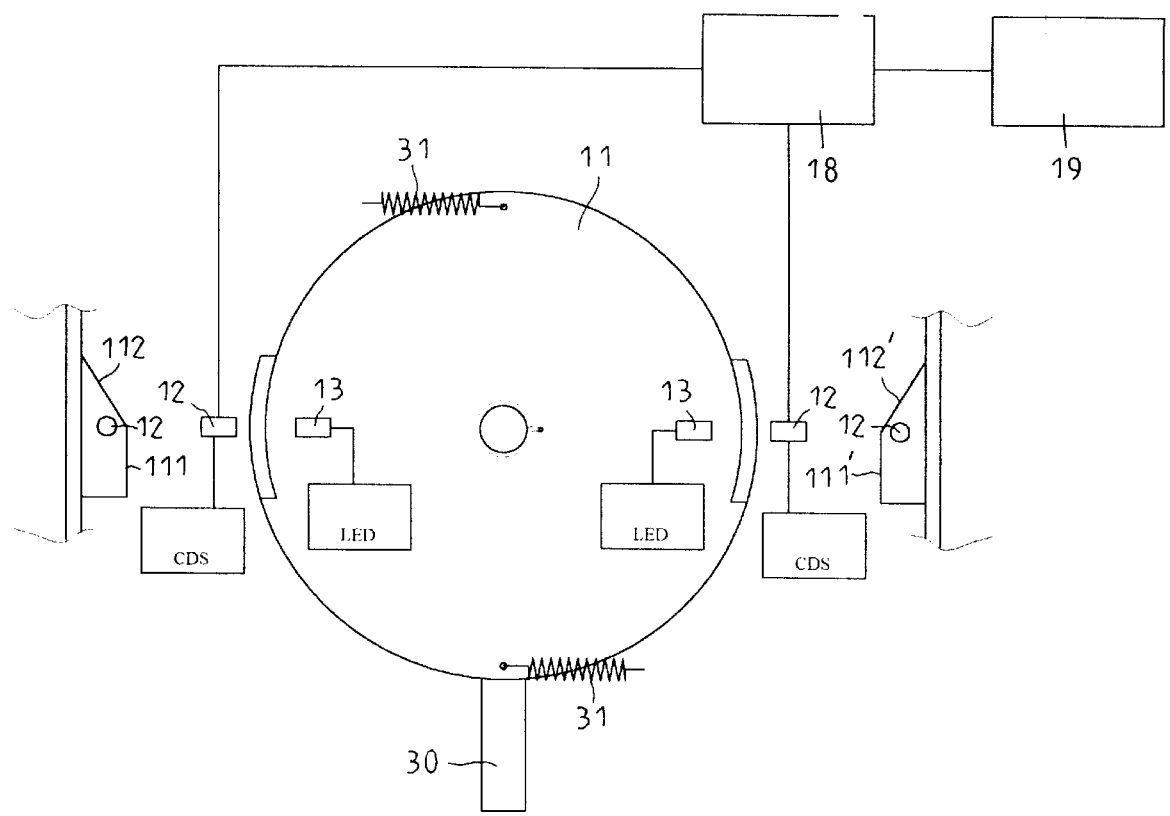
FIG. 6 is a schematic use state view of the electronic accelerator of a motorized vehicle as shown in FIG. 5.
Figure 6:
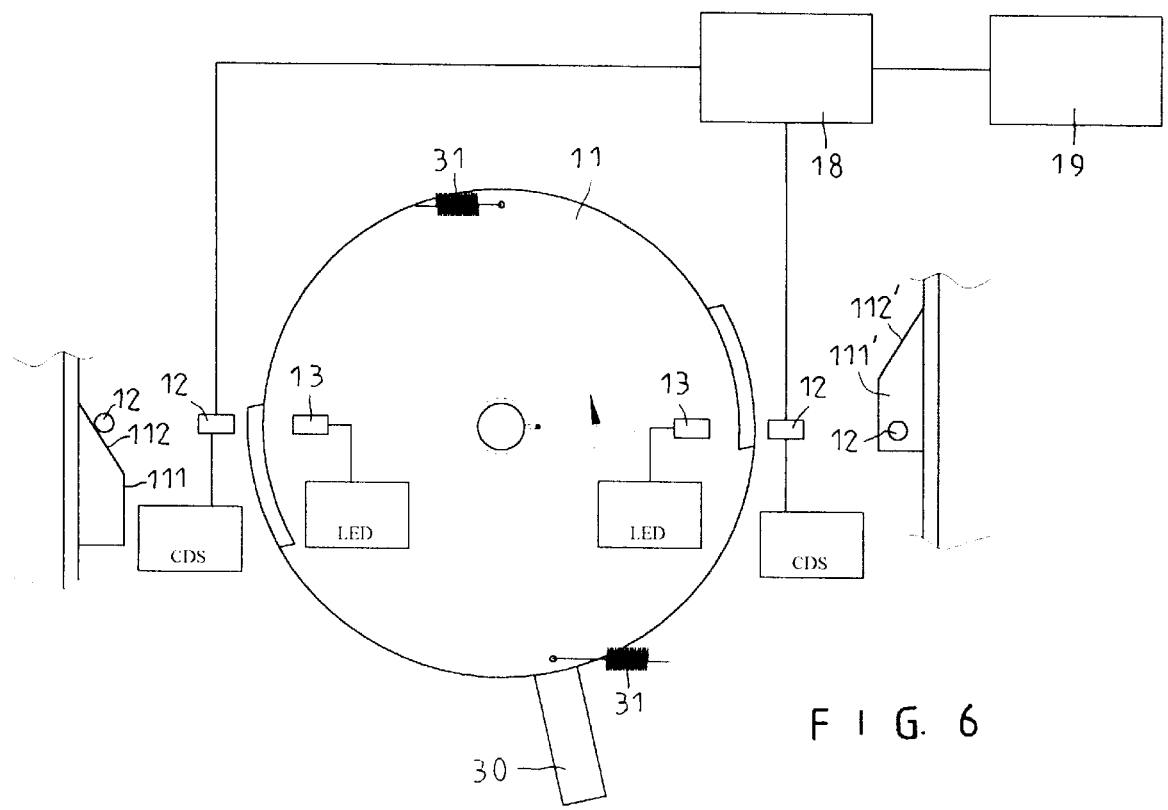

Referring to FIGS. 5 and 6, an electronic accelerator of a motorized vehicle in accordance with a third embodiment of the present invention is used to an accelerating lever 30. The shield 11 is mounted on the accelerating lever 30. The shield 11 has two sides respectively provided with two shield planes 111, 111' and two shield inclined faces 112, 112', so as to increase or decrease the speed of the motorized vehicle when the motorized vehicle is moved forward or backward. When the shield plane 111 at one side shields the light signal of the light sensitive resistor 12 from the focusing type LED 13, the shield inclined plane 112' at the other side allows the light sensitive resistor 12 to receive the light source from the focusing type LED 13. The tensile spring 31 is used for fixing the shield 11. The accelerating lever 30 can be automatically restored to the middle position by the restoring force of the tensile spring 31, thereby achieving the purpose of controlling the rotational speed of the motor 19.

Accordingly, in the electronic accelerator of a motorized vehicle in accordance with the present invention, the shield is provided with the arc-shaped surface whose shielding area is gradually reduced, such that when the accelerator drives the shield, the light source receiving amount of the light sensitive resistor from the focusing type LED is increased. The amount of the light source received by the light sensitive resistor from the focusing type LED is converted into different signals, and the light sensitive resistor transmits the signals to the rotational speed controller, thereby increasing the current output of the rotational speed controller to the motor, so as to increase the rotational speed of the motor.

In such a manner, the light sensitive resistor, the shield, and the focusing type LED are not in contact with each other, thereby preventing wearing the electronic elements due to friction, thereby efficiently prolonging the lifetime thereof.

Although the invention has been explained in relation to its preferred embodiment as mentioned above, it is to be understood that many other possible modifications and variations can be made without departing from the scope of the present invention.

What is claimed is:

1. An electronic accelerator of a motorized vehicle comprising:

a handlebar (15);

an accelerating handle (10) rotatably mounted on said handlebar (15);

a light sensitive resistor (12) secured on said handlebar (15);

a focusing type LED (13) secured on said handlebar (15) and spaced apart from said light sensitive resistor (12);

a fixing housing (16) mounted on said handlebar (15) for entirely covering said light sensitive resistor (12) and said focusing type LED (13);

a shield (11) mounted on said accelerating handle (10) to rotate therewith, and located between said light sensitive resistor (12) and said focusing type LED (13); and an arc-shaped surface (14) secured on said shield (11) to move therewith, and located between said light sensitive resistor (12) and said focusing type LED (13), said arc-shaped surface (14) having a shielding area gradually reduced from one side to the other side;

wherein, when said accelerating handle (10) is rotated relative to said handlebar (15), said shield (11) is rotated to move said arc-shaped surface (14) to adjustably shield a light source receiving amount of said light sensitive resistor (12) from said focusing type LED (13), and said light sensitive resistor (12) transmits a signal to a rotational speed controller (18), so as to increase or decrease a speed of a motor (19).

2. The electronic accelerator of a motorized vehicle in accordance with claim 1, wherein said accelerator is provided with two shields, two light sensitive resistors, and two focusing type LED, said shield having two sides respectively provided with two shield planes and two shield inclined faces, so as to increase or decrease a speed of a motorized vehicle when said motorized vehicle is moved forward or backward.

* * * * *